(12) United States Patent
Ebrahimi Afrouzi et al.

(10) Patent No.: US 10,913,310 B1
(45) Date of Patent: *Feb. 9, 2021

(54) ROBOTIC FLOOR CLEANING DEVICE WITH EXPANDABLE WHEELS

(71) Applicants: Ali Ebrahimi Afrouzi, San Jose, CA (US); Shahin Fathi Djalali, San Leandro, CA (US)

(72) Inventors: Ali Ebrahimi Afrouzi, San Jose, CA (US); Shahin Fathi Djalali, San Leandro, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/247,092

(22) Filed: Jan. 14, 2019

Related U.S. Application Data

(63) Continuation of application No. 15/447,623, filed on Mar. 2, 2017, now Pat. No. 10,214,050.

(60) Provisional application No. 62/302,942, filed on Mar. 3, 2016.

(51) Int. Cl.
*B60B 19/04* (2006.01)
*B60B 1/06* (2006.01)
*A47L 11/40* (2006.01)

(52) U.S. Cl.
CPC ........... *B60B 19/04* (2013.01); *A47L 11/4011* (2013.01); *A47L 11/4066* (2013.01); *A47L 11/4072* (2013.01); *B60B 1/06* (2013.01); *A47L 2201/04* (2013.01)

(58) Field of Classification Search
CPC .... A47L 11/4072; A47L 2201/04; B60B 1/06; B60B 1/12; B60B 1/14; B60B 19/04
USPC ...................................... 301/5.305, 12.2, 45
See application file for complete search history.

(56) References Cited

U.S. PATENT DOCUMENTS

| | | |
|---|---|---|
| 1,371,980 A | 3/1921 | Ramsey |
| 1,408,885 A | 3/1922 | Humphery |
| 1,435,042 A | 11/1922 | Zottoli |
| 1,450,626 A | 4/1923 | Atwood |
| 1,469,393 A | 10/1923 | O'Connor |
| 1,890,872 A | 12/1932 | Van Kleeck |
| 2,610,898 A | 9/1952 | Smith |
| 2,916,331 A | 12/1959 | Gardner |
| 2,924,486 A | 2/1960 | Blaschke |
| 3,672,458 A | 6/1972 | Mackerle |
| 3,995,909 A | 12/1976 | Van Der Lely |
| 4,335,899 A | 6/1982 | Hiscock |
| 4,420,192 A | 12/1983 | Holchuk |
| 4,601,519 A | 7/1986 | D'Andrade |

(Continued)

FOREIGN PATENT DOCUMENTS

KR 101407662 B1 7/2014

*Primary Examiner* — Ruth Ilan
*Assistant Examiner* — Maurice L Williams

(57) ABSTRACT

Provided is a wheel including: a main housing with a series of apertures disposed radially thereabout; an inner shaft disposed within the main housing and rotatably coupled thereto; a set of spokes distributed radially around the inner shaft and attached thereto at a first end, each spoke positioned within one of the series of apertures in the main housing; a set of linkages distributed radially around the inner shaft and attached to a second end of the spokes, the linkages positioned within the apertures; and a set of rollers distributed radially around the inner shaft and mounted on the linkages; wherein the spokes, linkages, and rollers can be moved from a first, contracted position, to a second, expanded position.

20 Claims, 5 Drawing Sheets

(56) References Cited

U.S. PATENT DOCUMENTS

| | | | |
|---|---|---|---|
| 4,643,696 A | 2/1987 | Law | |
| 4,648,853 A | 3/1987 | Siegfried | |
| 4,773,889 A | 9/1988 | Rosenwinkel | |
| 5,487,692 A | 1/1996 | Mowrer | |
| 5,492,390 A | 2/1996 | Kugelmann, Sr. | |
| 5,690,375 A | 11/1997 | Schneider | |
| 5,894,621 A | 4/1999 | Kubo | |
| 6,860,346 B2 | 3/2005 | Burt | |
| 7,503,567 B2 | 3/2009 | Frankie | |
| 7,568,536 B2 | 8/2009 | Yu | |
| 7,594,527 B2 | 9/2009 | Thompson | |
| 7,730,978 B2 | 6/2010 | Dixon | |
| 8,007,341 B2 * | 8/2011 | Su | A63H 17/36 446/431 |
| 8,814,626 B2 | 8/2014 | Smith | |
| 9,073,587 B2 | 7/2015 | Kim | |
| 9,168,786 B2 | 10/2015 | Schlee | |
| 9,616,707 B2 | 4/2017 | Jochim | |
| 9,757,978 B1 | 9/2017 | Emigh | |
| 9,878,576 B2 | 1/2018 | Hein | |
| 9,950,567 B2 | 4/2018 | Pfrenger | |
| 10,214,050 B1 * | 2/2019 | Ebrahimi Afrouzi | A47L 11/4072 |
| 2003/0037410 A1 | 2/2003 | Yamaguchi | |
| 2010/0141018 A1 | 6/2010 | McCue | |
| 2010/0187779 A1 | 7/2010 | Potter | |
| 2010/0224427 A1 | 9/2010 | Nuchter | |
| 2013/0014580 A1 * | 1/2013 | Lin | G01M 1/045 73/462 |
| 2013/0167991 A1 | 7/2013 | Donohue | |
| 2014/0117637 A1 | 5/2014 | Solheim | |
| 2014/0252844 A1 | 9/2014 | Riwan | |
| 2015/0084398 A1 * | 3/2015 | Lee | B60B 1/003 301/66 |
| 2015/0151572 A1 | 6/2015 | Parrott | |
| 2015/0165498 A1 | 7/2015 | Kim | |
| 2016/0193877 A1 | 7/2016 | Jang | |
| 2017/0349003 A1 | 12/2017 | Joso | |
| 2018/0020894 A1 | 1/2018 | Sauer | |
| 2018/0022148 A1 | 1/2018 | Lin | |
| 2018/0126779 A1 | 5/2018 | Brandl | |

* cited by examiner

US 10,913,310 B1

ROBOTIC FLOOR CLEANING DEVICE WITH EXPANDABLE WHEELS

CROSS-REFERENCE TO RELATED APPLICATIONS

This application is a continuation of U.S. patent application Ser. No. 15/447,623, filed Mar. 2, 2017, which is a Non-Provisional Patent Application of U.S. Provisional Patent Application No. 62/302,942 filed Mar. 3, 2016, each of which are hereby incorporated by reference.

FIELD OF THE DISCLOSURE

The present invention relates to robotic floor cleaning devices, and, more particularly, the wheels of robotic floor cleaning devices.

BACKGROUND

Robotic floor cleaning devices are being used with increasing frequency to maintain clean floors in residential and commercial settings.

One problem in designing robotic floor cleaning devices is selecting a wheel size for the device. Larger wheels may aid a device in driving over obstacles and may allow the device more autonomy and mobility. However, smaller wheels may be better for navigating through environments with lots of obstacles near each other. Additionally, larger wheels may cause the chassis of a robotic floor cleaning device to further from the work surface, which may affect the cleaning efficacy of the device. A need exists for a robotic floor cleaning device that can expand wheels for driving over obstacles when necessary, and contract them when the larger wheel size is not needed.

SUMMARY

The following presents a simplified summary of some embodiments of the techniques described herein in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented below.

Some aspects provide a wheel including: a main housing with a series of apertures disposed radially thereabout; an inner shaft disposed within the main housing and rotatably coupled thereto; a set of spokes distributed radially around the inner shaft and attached thereto at a first end, each spoke positioned within one of the series of apertures in the main housing; a set of linkages distributed radially around the inner shaft and attached to a second end of the spokes, the linkages positioned within the apertures; and a set of rollers distributed radially around the inner shaft and mounted on the linkages; wherein the spokes, linkages, and rollers can be moved from a first, contracted position in which the spokes are positioned at a first angle with respect to a radius line connecting the center of the inner shaft and the first end of the respective spoke and in which the linkages and the rollers are pulled by the spokes towards the inner shaft, to a second, expanded position, in which the spokes are positioned at a second angle, greater than the first angle, with respect to the radius line connecting the center of the inner shaft and the first end of the respective spoke and the linkages and in which the rollers are pushed outward from the inner shaft by clockwise or counter-clockwise rotation of the inner shaft relative to the main housing.

Some aspects provide a robotic device including: a chassis including a set of wheels; a motor to drive the wheels; a central processing unit; a battery to power the motor; and one or more sensors; wherein each wheel includes: a main housing with a series of apertures disposed radially thereabout; an inner shaft disposed within the main housing and rotatably coupled thereto; a set of spokes distributed radially around the inner shaft and attached thereto at a first end, each spoke positioned within one of the series of apertures in the main housing; a set of linkages distributed radially around the inner shaft and attached to a second end of the spokes, the linkages positioned within the apertures; and a set of rollers distributed radially around the inner shaft and mounted on the linkages; whereby the spokes, linkages, and rollers can be moved from a first, contracted position in which the spokes are positioned at a first angle with respect to a radius line connecting the center of the inner shaft and the first end of the respective spoke and in which the linkages and the rollers are pulled by the spokes towards the inner shaft, to a second, expanded position, in which the spokes are positioned at a second angle, greater than the first angle, with respect to the radius line connecting the center of the inner shaft and the first end of the respective spoke and the linkages and in which the rollers are pushed outward from the inner shaft by clockwise or counter-clockwise rotation of the inner shaft relative to the main housing.

DETAILED DESCRIPTION OF SOME EMBODIMENTS

The present inventions will now be described in detail with reference to a few embodiments thereof as illustrated in the accompanying drawings. In the following description, numerous specific details are set forth in order to provide a thorough understanding of the present inventions. It will be apparent, however, to one skilled in the art, that the present invention may be practiced without some or all of these specific details. In other instances, well known process steps and/or structures have not been described in detail in order to not unnecessarily obscure the present invention. Further, it should be emphasized that several inventive techniques are described, and embodiments are not limited to systems implanting all of those techniques, as various cost and engineering trade-offs may warrant systems that only afford a subset of the benefits described herein or that will be apparent to one of ordinary skill in the art.

The present invention proposes a robotic floor cleaning device with expandable wheels. The robotic floor cleaning device comprises a shell, a chassis, a set of expandable wheels; at least one motor connected to the wheels for moving the robotic floor cleaning device on a surface; a control unit to control movement of the device, and a means for cleaning a work surface.

Any number of wheels may comprise the set of expandable wheels.

Figure 1:
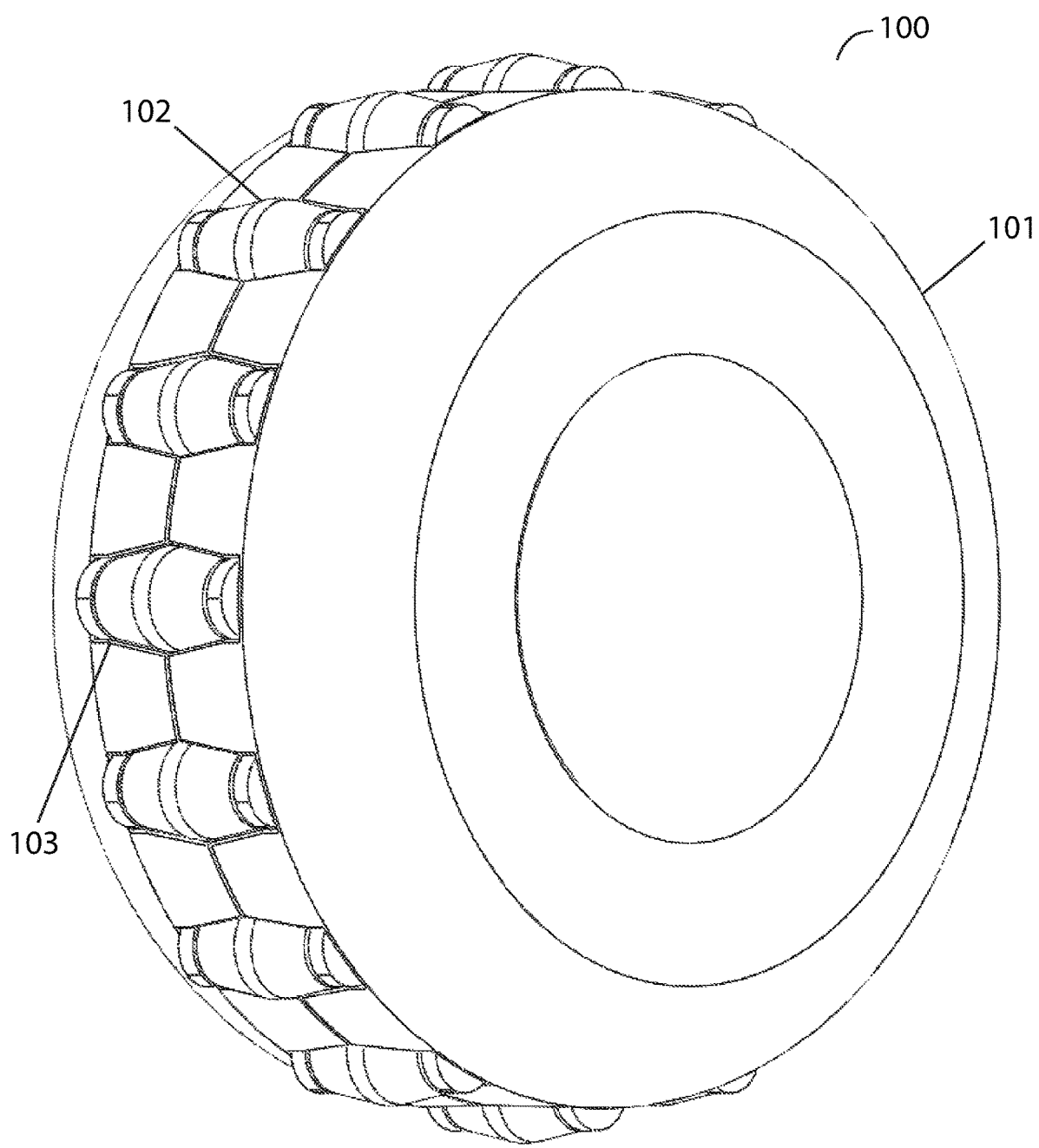
FIG. 1 illustrates a perspective view of an example of an expandable wheel in a contracted position, embodying features of the present invention.

Referring to FIG. 1, a perspective view of an example of an expandable wheel 100 is illustrated in a contracted position. As can be seen, each roller 102 protrudes slightly through an aperture 103. Again, the main housing 101 of the wheel remains fixed when the rollers are pushed outward through the apertures to create a larger wheel circumference.

Figure 2:
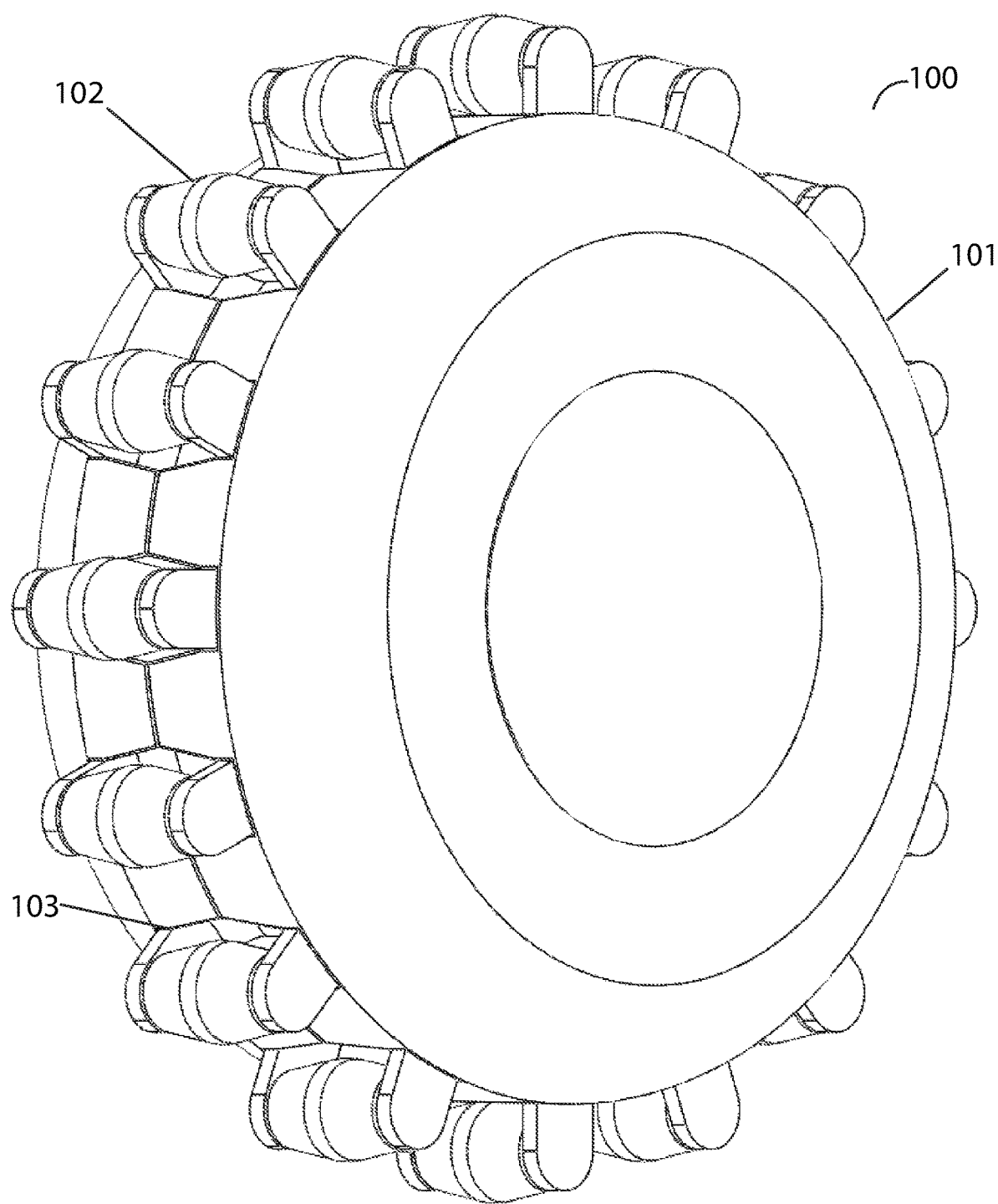
FIG. 2 illustrates a perspective view of an example of an expandable wheel in an expanded position, embodying features of the present invention.

Referring to FIG. 2, an example of expandable wheel 100 is illustrated in an expanded position. As can be seen, the main housing 101 of the wheel has remained in a fixed position in relation to the rollers 102, which have been pushed radially outward from the center of the wheel through the apertures 103 via spokes within the wheel (not shown). Each roller is mounted at the end of a link member so as to be rotatable around an axial of the roller.

Figure 3:
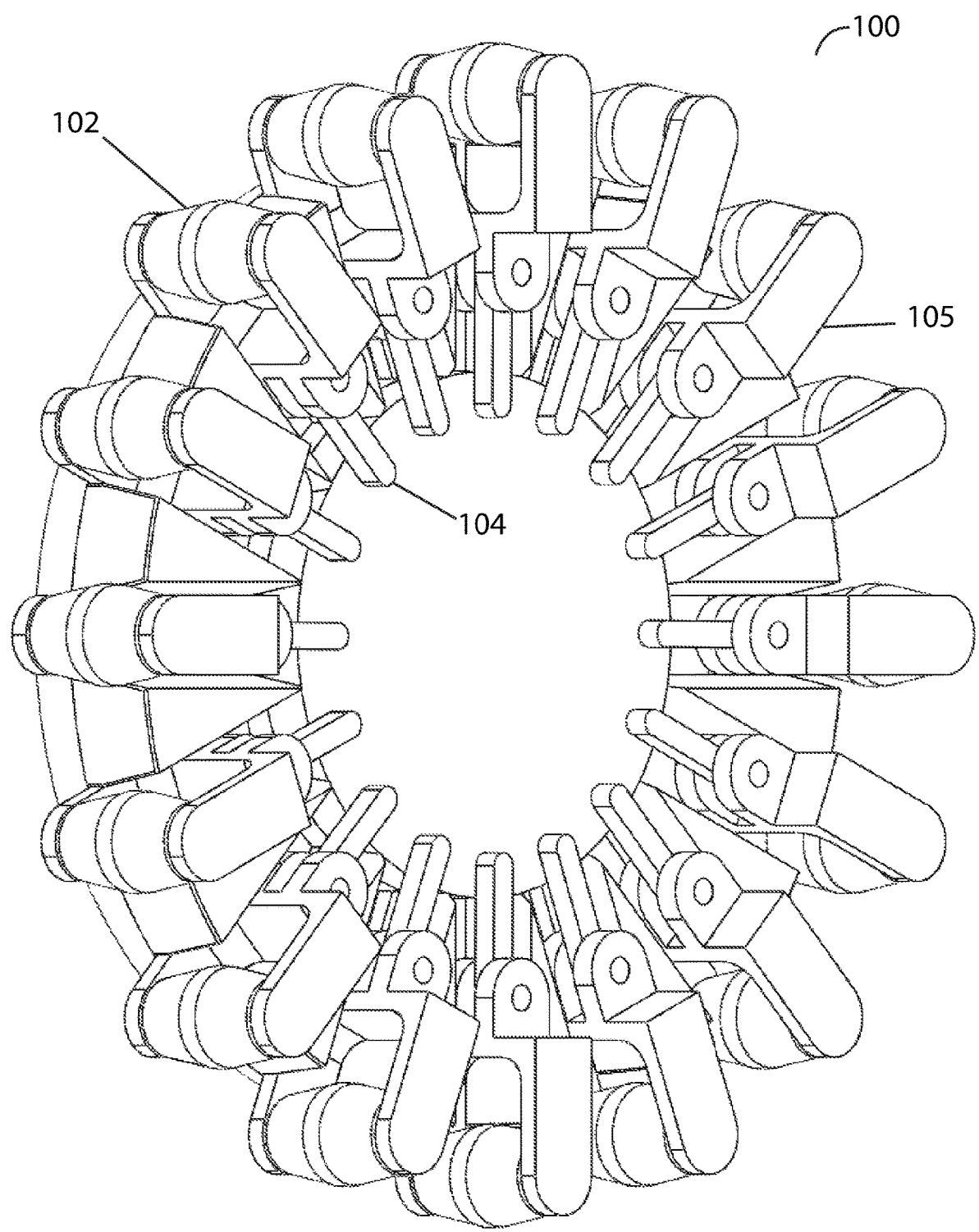
FIG. 3 illustrates a cutaway of an example of an expandable wheel, embodying features of the present invention.

Referring to FIG. 3, an example of a cutaway of the wheel 100 is illustrated to show the interior parts. Each roller 102 is mounted on the end of a pivoting linkage 105 connected to a spoke 104. The inner ends of the spokes are connected to an inner shaft (not shown) that is rotated within the wheel to push the spokes in or out. In the preferred embodiment, the rollers are rotatable around an axial.

Figure 4A:
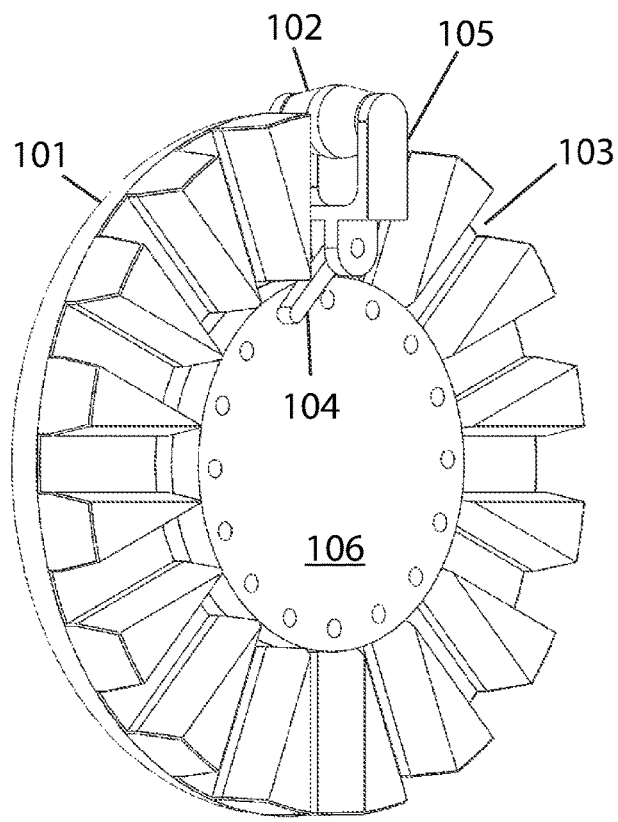
FIG. 4A illustrates a cutaway of an example of an expandable wheel in a contracted position, embodying features of the present invention.
Figure 4B:
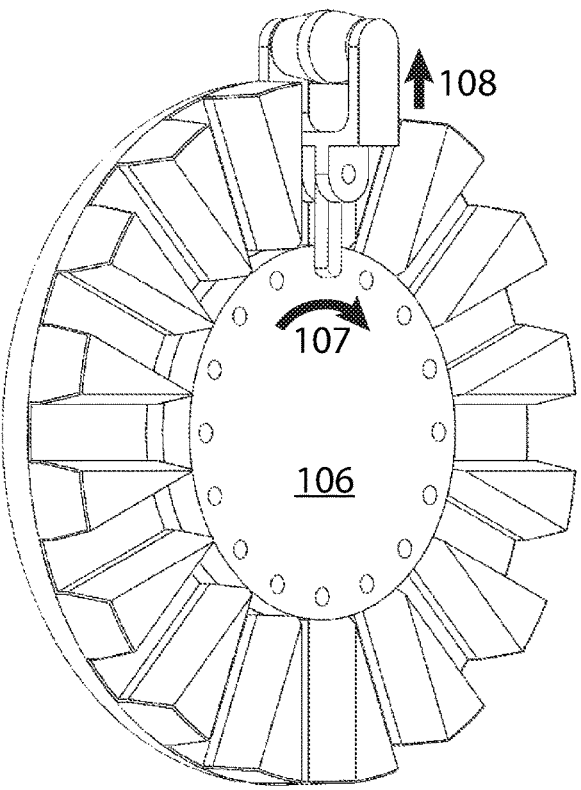
FIG. 4B illustrates a cutaway of an example of an expandable wheel in an expanded position, embodying features of the present invention.

Referring briefly to both FIGS. 4A and 4B, examples of cutaway views of the wheel are illustrated to more clearly portray the internal parts. In both drawings, a singular spoke, linkage, and roller is illustrated in order to portray the parts more clearly, however, in practice, each of the apertures 103 would contain a spoke, linkage and roller. Referring to FIG. 4A, the spoke 104, linkage 105 and roller 102 are in a contracted position. The spoke 104 is mounted pivotally by a first end to an inner shaft 106, which is co-centered and coupled within the main housing 101. The inner shaft is coupled with the main housing in such a way as to allow rotation of the inner shaft with relation to the main housing. Such rotation causes the spokes together with the pivoting linkages to work as a crank mechanism and translate the relative rotation of the two parts to a linear movement of the roller outward from the center of the wheel, the aperture working as a guide. As shown in FIG. 4B, this movement results in each spoke, linkage, and roller group to be extended in a radially outward direction 108. When the inner shaft 106 is rotated in direction 107 and goes from the position shown in FIG. 4A to the position shown in FIG. 4B wherein each spoke is parallel with the corresponding aperture, the spokes and linkages are pushed outward, causing the rollers to protrude further through the apertures.

In some embodiments, when the inner shaft and main housing are rotated in the same direction and at the same rate, the wheel simply turns as a normal wheel and the rollers, spokes and linkages are not pushed outward or inward. In some embodiments, it is when the inner shaft is rotated in an opposite direction of the main housing that the rollers, spokes and linkages are pushed outward or inward.

Figure 5A:
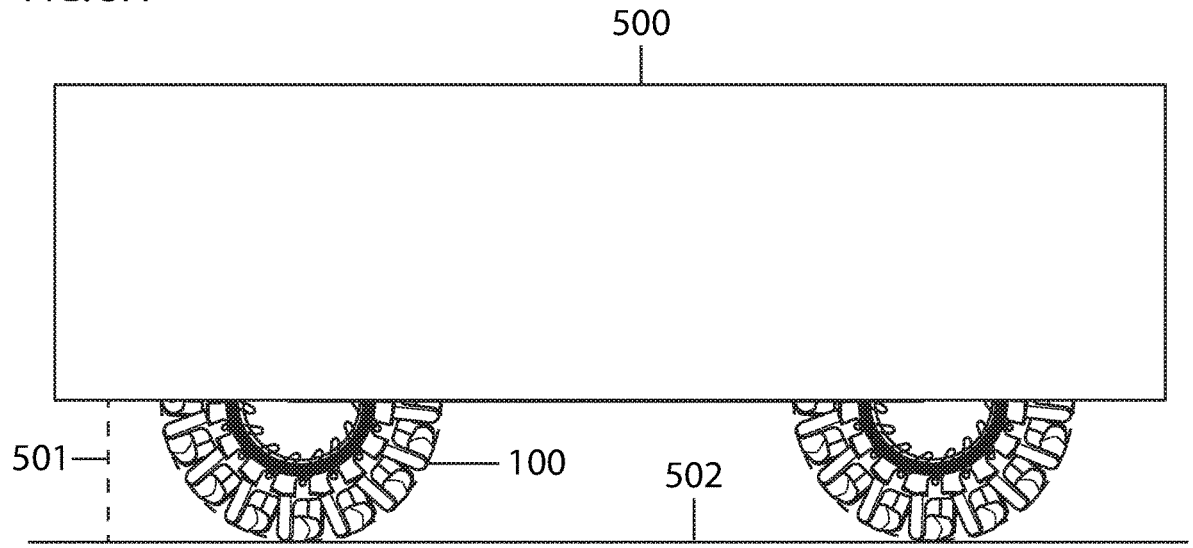
FIG. 5A illustrates a side elevation view of an example of a robotic floor cleaning device with expandable wheels in a contracted position, embodying features of the present invention.

Referring to FIG. 5A, a side elevation view of an example of a robotic floor cleaning device 500 with expanding wheels 100 in their contracted position is illustrated. In this example, the wheels 100 are in a contracted position and thus have their smallest possible circumference. This maintains a smallest possible distance 501 to the work surface 502, which may aide the device in driving under furniture and picking up debris.

Figure 5B:
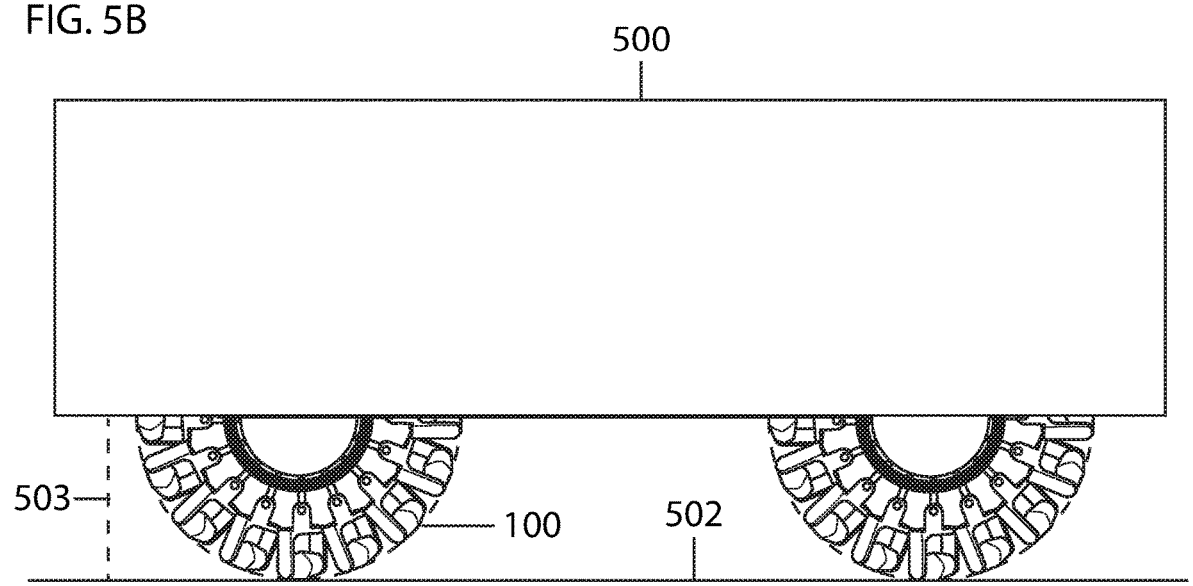
FIG. 5B illustrates a side elevation view of an example of a robotic floor cleaning device with expandable wheels in an expanded position embodying features of the present invention.

Referring to FIG. 5B, an example of a side elevation view of the robotic floor cleaning device 500 with expanding wheels 100 in an expanded position is illustrated. In this example, the wheels 100 are in an expanded position and thus have their greatest possible circumference. This maintains a greatest possible distance 503 to the work surface 502, which may aide the device in driving over obstacles or various work surfaces.

In some embodiments, the invention further comprises sensors to detect conditions when the wheels should be expanded. For example, a sensor monitoring tension on wheels may cause the wheels to expand when more than a predetermined amount of tension is detected. Similarly, a sensor monitoring rate of rotation of a wheel may cause the wheels to expand when it is determined that rotation is not concurrent with motor power. It will be obvious to one skilled in the art that the disclosed invention can benefit from any kind of sensing mechanism to detect tension etc.

The invention claimed is:

1. A wheel comprising:
   a main housing with a series of apertures disposed radially thereabout;
   an inner shaft disposed within the main housing and rotatably coupled thereto;
   a set of spokes distributed radially around the inner shaft and attached thereto at a first end, each spoke positioned within one of the series of apertures in the main housing;
   a set of linkages distributed radially around the inner shaft and attached to a second end of the spokes, the linkages positioned within the apertures; and
   a set of rollers distributed radially around the inner shaft and mounted on the linkages;
   wherein the spokes, linkages, and rollers can be moved from a first, contracted position in which the spokes are positioned at a first angle with respect to a radius line connecting the center of the inner shaft and the first end of the respective spoke and in which the linkages and the rollers are pulled by the spokes towards the inner shaft, to a second, expanded position, in which the spokes are positioned at a second angle, greater than the first angle, with respect to the radius line connecting the center of the inner shaft and the first end of the respective spoke and the linkages and in which the rollers are pushed outward from the inner shaft by clockwise or counter-clockwise rotation of the inner shaft relative to the main housing.

2. The wheel of claim 1, wherein a sleeve is provided around each aperture.

3. The wheel of claim 1, wherein the spokes, linkages, and rollers are maintained at any position between the first, contracted position and the second, expanded position.

4. The wheel of claim 1, wherein the wheel has between 10 and 20 apertures, spokes, linkages, and rollers.

5. The wheel of claim 1, wherein the wheel further comprises one or more sensors.

6. The wheel of claim 5, wherein the one or more sensors measure a wheel tension.

7. The wheel of claim 6, wherein the wheel expands when the wheel tension is above a first predetermined threshold and retracts when the wheel tension is below a second predetermined threshold.

8. The wheel of claim 5, wherein the one or more sensors measure a wheel speed.

9. The wheel of claim 8, wherein the wheel expands and retracts based on data from a sensor monitoring a rate of rotation of the wheel and an expected rate of rotation of the wheel determined based on power supplied to a motor that drives the wheels.

10. The wheel of claim 5, wherein the movement of the wheel from the first, contracted position to the second, expanded position is at least partially based on data collected by the one or more sensors.

11. The wheel of claim 1, wherein the wheel is a wheel of a robotic device.

12. A robotic device comprising:
a chassis including a set of wheels;
a motor to drive the wheels;
a central processing unit;
a battery to power the motor; and
one or more sensors;
wherein each wheel comprises:
a main housing with a series of apertures disposed radially thereabout;
an inner shaft disposed within the main housing and rotatably coupled thereto;
a set of spokes distributed radially around the inner shaft and attached thereto at a first end, each spoke positioned within one of the series of apertures in the main housing;
a set of linkages distributed radially around the inner shaft and attached to a second end of the spokes, the linkages positioned within the apertures; and
a set of rollers distributed radially around the inner shaft and mounted on the linkages;
whereby the spokes, linkages, and rollers can be moved from a first, contracted position in which the spokes are positioned at a first angle with respect to a radius line connecting the center of the inner shaft and the first end of the respective spoke and in which the linkages and the rollers are pulled by the spokes towards the inner shaft, to a second, expanded position, in which the spokes are positioned at a second angle, greater than the first angle, with respect to the radius line connecting the center of the inner shaft and the first end of the respective spoke and the linkages and in which the rollers are pushed outward from the inner shaft by clockwise or counter-clockwise rotation of the inner shaft relative to the main housing.

13. The robotic device of claim 12, wherein a sleeve is provided around each aperture.

14. The robotic device of claim 12, wherein the spokes, linkages, and rollers are maintained at any position between the first, contracted position and the second, expanded position.

15. The robotic device of claim 12, wherein each wheel has between 10 and 20 apertures, spokes, linkages, and rollers.

16. The robotic device of claim 12, wherein the one or more sensors measure a wheel tension.

17. The robotic device of claim 16, wherein the wheel expands when the wheel tension is above a first predetermined threshold and retracts when the wheel tension is below a second predetermined threshold.

18. The robotic device of claim 12, wherein the one or more sensors measure a wheel speed.

19. The robotic device of claim 18, wherein the wheel expands and retracts based on data from the one or more sensors monitoring the wheel speed and an expected wheel speed determined based on an amount of power supplied to the motor.

20. The robotic device of claim 12, wherein the movement of the wheel from the first, contracted position to the second, expanded position is at least partially based on data collected by the one or more sensors.

* * * * *